A. E. BEALS.
PROCESS OF MAKING ICE.
APPLICATION FILED NOV. 23, 1908.
959,697.
Patented May 31, 1910.
2 SHEETS—SHEET 1.
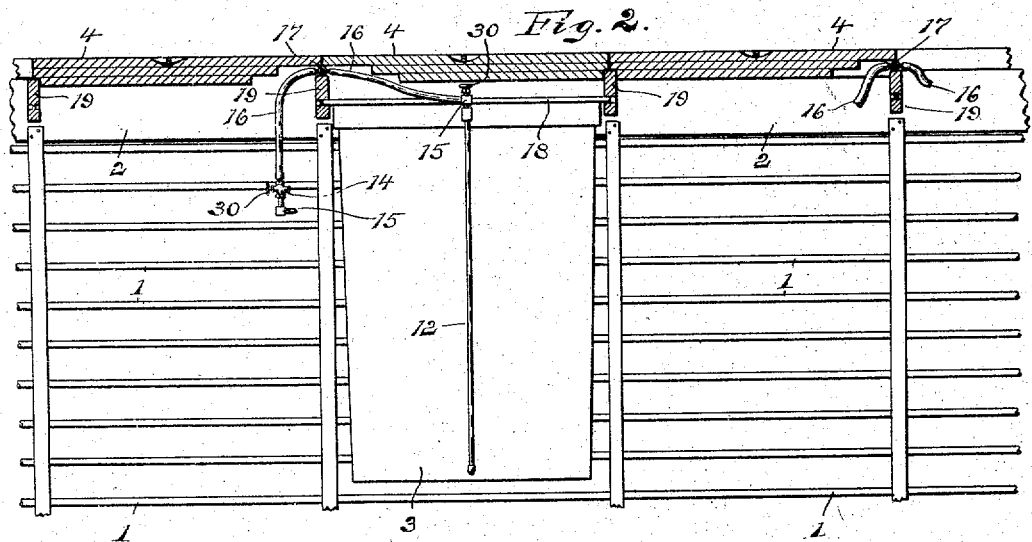
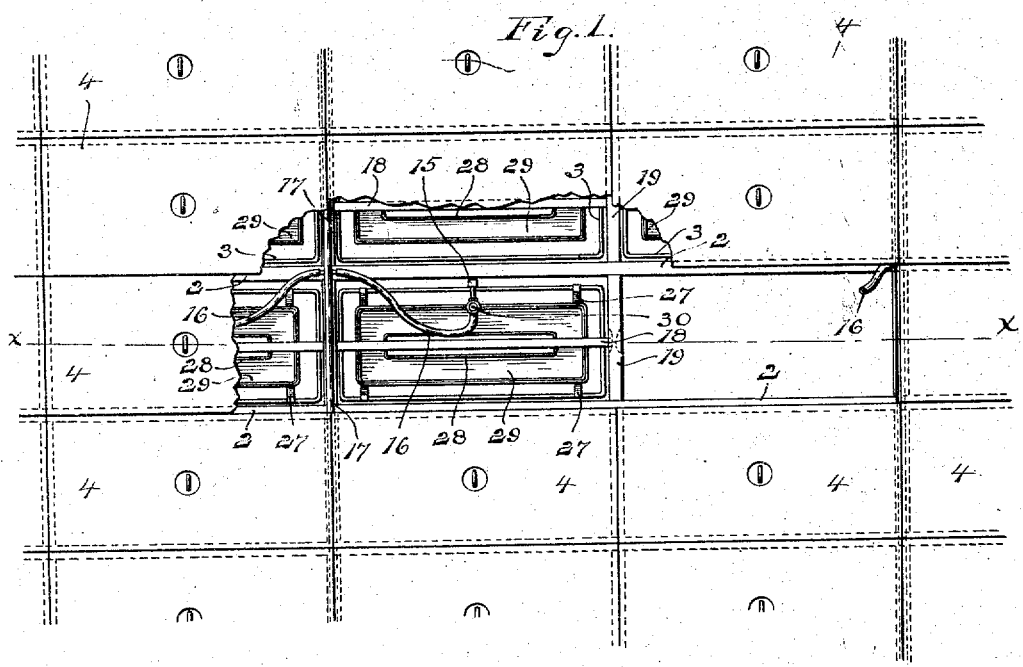
WITNESSES:
INVENTOR
Albert E. Beals
BY
Barthel & Barthel
ATTORNEYS A. E. BEALS.
PROCESS OF MAKING ICE.
APPLICATION FILED NOV. 23, 1908.
959,697.
Patented May 31, 1910.
2 SHEETS—SHEET 2.
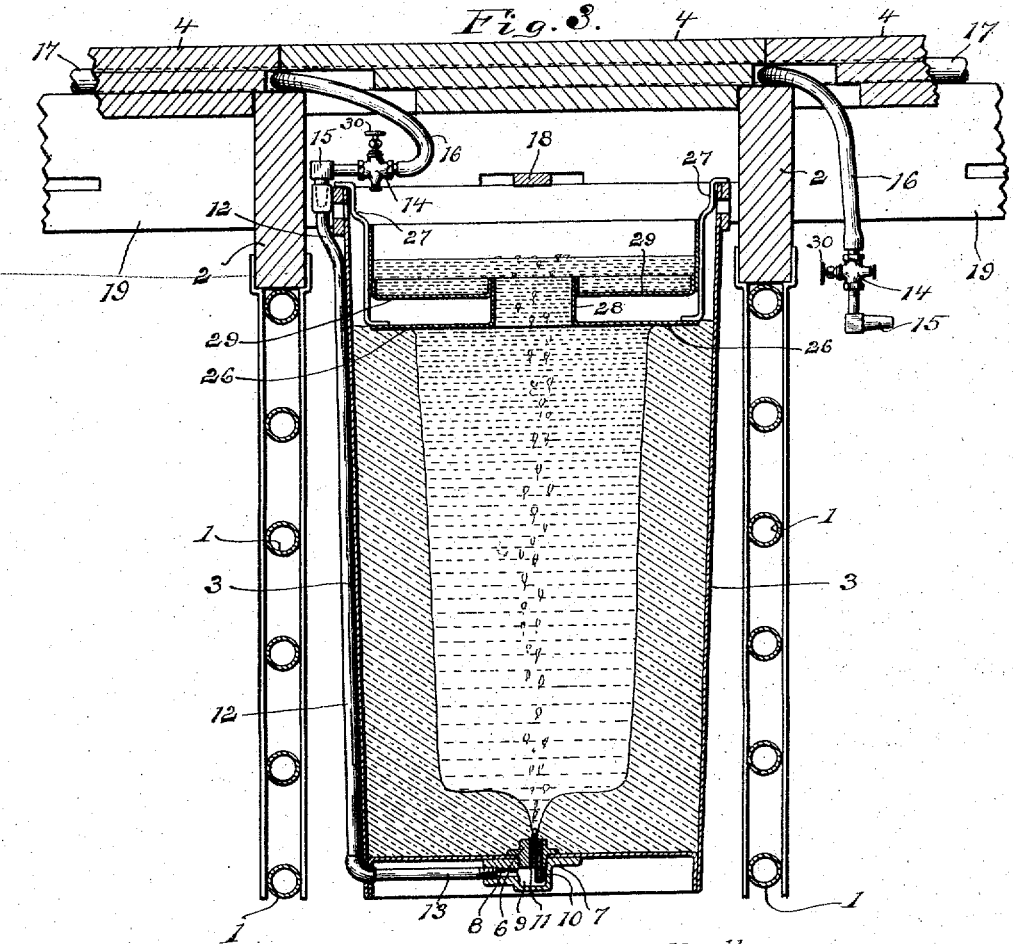
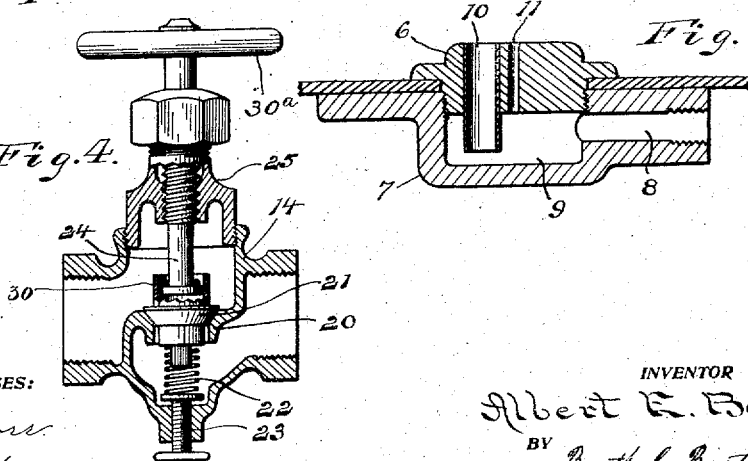
WITNESSES:
Anna M Dorr
C R Stickney
INVENTOR
Albert E. Beals
BY Barthel & Barthel
ATTORNEYS

UNITED STATES PATENT OFFICE.

ALBERT E. BEALS, OF DETROIT, MICHIGAN.

PROCESS OF MAKING ICE.

959,697.  Specification of Letters Patent.  Patented May 31, 1910.

Application filed November 23, 1908. Serial No. 463,985.

*To all whom it may concern:*

Be it known that I, ALBERT E. BEALS, a citizen of the United States of America, residing at Detroit, in the county of Wayne and State of Michigan, have invented certain new and useful Improvements in Processes of Making Ice, of which the following is a specification, reference being had therein to the accompanying drawings.

In the process of manufacturing ice in cans or molds by means of mechanical refrigeration, thus forming blocks of uniform size, it is necessary in order that the product shall be of sufficient clearness and purity for commercial purposes, to eliminate as far as possible all air particles and other impurities which are held both in solution and suspension and which are always present in water in its natural or "raw" state. The usual method of procedure at present is to fill the cans with water which has previously been distilled from its impurities and then reboiled to further expel the air and foul gases.

In order to permit the filling direct into the freezing cans of any potable water as supplied by nature, thus obviating the expensive method of distillation, and from this water to produce a pure and wholesome block of ice, it is necessary to provide means whereby the air particles and other impurities are prevented from becoming entrained in the forming ice.

If "raw" water is allowed to remain practically in a state of rest when contained in a can during the process of freezing, which progresses from the sides and bottom toward the center, the air particles and the insoluble impurities in suspension gather on the surface of the forming ice and are thus distributed throughout the block, while the impurities in solution continue soluble in the remaining unfrozen portion of water and are gradually forced to the center of the block where the solution becomes concentrated and the impurities are thrown down as a precipitate. This method accordingly produces an impure and opaque block of ice unfit for domestic use. On the other hand, if "raw" water is kept continually in sufficient motion during the process of freezing, the movement of the water against the surface of the forming ice prevents the air particles and other impurities from finding lodgment there, with the result that they remain in the unfrozen portion of the water until the entire mass is congealed and the accumulation of all impurities will be concentrated in the center of the block.

In order to produce a commercially pure and transparent block of ice from "raw" water, when frozen in a can, it is therefore necessary to keep the mass of water continually in motion from the beginning to the final conclusion of the freezing process and to further provide means whereby the accumulated impurities are collected and deposited in some convenient manner exterior to the block without becoming trapped in the center.

This invention relates to a process of freezing any potable water in blocks without predistillation whereby the impurities naturally in solution and in suspension in the water are prevented from becoming entrained in the forming ice and whereby the accumulated impurities are eventually removed. These results are accomplished by, 1st; causing the water to be kept continually in sufficient motion from the beginning to the final conclusion of the process; this, to the extent of my knowledge and experience in the art, has not heretofore been successfully accomplished in can ice manufacture; 2nd; providing means whereby a certain extra amount of water, more than that sufficient to form the block of the required size, and which is supplied to the can at the time of filling, is kept in an unfrozen state in a position exterior to but in direct communication with the center of the block and in which the accumulated impurities are finally collected.

The means used for maintaining a continual movement of the mass of water is the introduction through the bottom of the can of air in sufficient quantity to produce the required results. The volume of air thus supplied is regulated and controlled automatically by means which insure a practically regular flow of air against a variably increasing pressure due to the increasing formation of ice above the air intake through which the air must maintain an open passage.

The invention consists in the matters hereinafter set forth and more particularly pointed out in the appended claims.

Referring to the drawings, Figure 1 is a plan view of a part of the freezing tank or floor of a refrigerating system adapted to carry out the process comprising the invention. Fig. 2 is a view in section thereof, on line x—x of Fig. 1. Fig. 3 is a view in vertical section of one of the cans of the system, showing adjacent connections. Fig. 4 is a view in detail of an automatic regulating valve. Fig. 5 is a view in detail of an air pipe connection and discharge nipple.

Referring to the drawings, 1 indicate coils of refrigerating pipe in the brine or freezing tank of a refrigerating plant disposed in the usual manner beneath girders or floor beams 2 at such intervals that cans 3 of proper proportions may be placed between them, removable cover blocks 4, one over each can, forming the floor as in the usual conventional arrangement of a plant of this nature. The can itself is of metal, rectangular in section and is slightly tapered as shown. A nipple or boss 6 is secured centrally in the bottom of the can in screw-threaded engagement with an outer cap 7 having a lateral inlet 8 into a central chamber 9 whose base lies at an interval below the level of the inlet. A short tube 10 in an aperture of the boss 6 extends just below the level of the air inlet 8 and there is an air vent 11 placed substantially in the center of the can through the boss at one side of the tube. An air pipe 12 having a lower horizontal arm 13 screw-threaded into the inlet 8 of the cap, extends across the bottom and up the side of the can to which it is secured by any convenient means. The casing 14 of an automatic regulating valve is secured at its outlet end to a fitting 15 removably supported in the upper end of the pipe 12. The inlet of the valve is so connected by any preferred means, as for example, a short length of flexible tubing 16, with one of a series of trunk lines 17 of piping laid on the sills 2, underneath the covers as shown, in any preferred and conventional manner. The trunk lines are supplied with air under pressure from any suitable compressor or like available means. The can floats in the brine or freezing mixture in the tank, usually being held immersed to the proper depth by a removable cross-bar 18 engaging slots in spreader blocks 19 between the sills.

The casing 14 of the valve has an apertured seat 20 provided with a movable closure 21 whose upper face is of greater area than the lower face. A spring 22 between the closure and a regulating screw 23 in the bottom of the body tends to force the closure away from the seat 20 but is resisted by the inlet air pressure on top. The closure has reciprocable motion on the lower end of a stem 24 that is defined or limited by suitable stops 30. The stem is screw-threaded through or otherwise longitudinally adjustable in a bonnet 25 on the casing and provided with a hand wheel 30 whereby the valve may be positively closed, or opened, and whereby the flow of air through the valve may be regulated to produce the required agitation in the water.

The intake end of the casing which is secured to the hose 16, admits air above the seat and closure and the outlet end connected to the fitting 15 or like connection, opens from below the seat and closure.

A horizontal plate 26 somewhat smaller than the upper end of the cap is detachably secured in the upper end thereof as by suitable brackets 27 or the like. The plate is centrally apertured and is provided with an upright flange 28 around the opening. An overflow basin or trap 29 is supported on the flange at an interval above the plate.

In operation, the can is filled to the required depth with "raw" water and immersed in the tank. Air is immediately introduced to the nipple through the automatic valve and pipe and injected into the bottom of the body of water, thus setting up and maintaining a continuous movement of the water against the face of the forming ice.

As the air enters the chamber 9 of the cap, the pressure therein must equal the sum of the pressure due to the static head of water above the jet plus that due to the velocity head of the air flowing through the jet which forces the water out of the chamber down to the mouth of the tube 10 thus freeing the air passages of all water which would otherwise freeze up and stop the flow. Ice forming in the bottom of the chamber permanently seals the piping 10 and the air continues to flow through the jet 11.

As the ice thickens on the sides and bottom of the can, it increases the pressure against which the air must escape and this increased back pressure in conjunction with the action of the spring opens the valve to a proportionate extent and thereby maintains the required flow of air. A constant agitation of the water in the center of the can by the ascending bubbles of air prevents the lodgment of air and impurities upon the surface of the forming ice and produces a clear and transparent block. At the same time the expansion due to formation of ice forces the aforementioned extra amount of water up through the top plate into the trap and the impurities which otherwise would collect and be deposited in the center of the block and carried up over the upper edge of the flange into the trap where they settle.

As the trap is insulated in a measure by the air space around its margin and also between it and the cover plate, the water in the trap does not freeze and consequently all impurities are held there and thus removed automatically from the block of ice up to the completion of the freezing process. By thus forcing a volume of air at a pressure which automatically increases in direct proportion to the resistance encountered in a freezing block, and thereby maintaining a continuous movement of the water until the final step of the freezing process, all the air and other impurities in solution and in suspension are removed from the block, and commercially pure and clear ice is obtained.

Obviously changes in the details of construction may be made without departing from the spirit of the invention and I do not care to limit myself to any particular form or arrangement of parts.

What I claim as my invention is:—

1. The herein described method of making ice free from impurities by the process of freezing water in cans through application of a refrigerating medium to the exterior of a can, which consists in confining water in a can during the process of freezing within the space initially occupied by it, in directing the water forced out by the expansion of the confined body through a restricted outlet, and in maintaining circulation in the uncongealed and expelled portion of the body by forcing air therethrough until the whole of the confined-body of water is solidified.

2. The herein described method of making ice free from impurities by the process of freezing water in cans by application of a refrigerating medium to the outside of the can, which consists in confining water in the can during the process of freezing within the space initially occupied by it, in directing the water expelled by the expansion of the confined body through a central outlet, in forcing a stream of air centrally through the confined body of water and through the outlet and in continuing the forcing of air therethrough until the whole of the confined body of water in the can is frozen.

3. The herein described method of making ice free from impurities by the process of freezing water in cans by application of a refrigerating medium to the can exteriors which consists in confining the water in the can during the process of freezing within the space initially occupied by it, directing the surplus water expelled by the expansion of the confined body while the freezing progresses upwardly through a central restricted aperture, in forcing air centrally through the body of water in the can whereby the air and the surplus water escapes through the same outlet, in continuing to force air through the body of water until the whole of the confined body is frozen, and in gradually increasing the force of the air as the freezing progresses.

4. The herein described method of making ice free from impurities by the process of freezing water in a can by application of a refrigerating medium to the exterior of the can, which consists in maintaining the level of the water at the position assumed in the liquid state, in directing the surplus water expelled by the expansion of the confined body to a point above the level through a restricted outlet, maintaining circulation in the uncongealed portion of the can contents into the outlet until the confined contents of the can is completely frozen.

5. The herein described method of making ice free from impurities by the process of freezing water in a can by application of a refrigerating means to the exterior of the can, which consists in maintaining the level of the water while being frozen at the position assumed in the initial state, in directing the surplus water expelled by the expansion of the confined body upwardly through a restricted opening, in trapping the expelled water, and forcing air through the can contents and through the outlet of the surplus water, and in maintaining the trapped water in a liquid state until the whole of the confined body is frozen.

In testimony whereof I affix my signature in presence of two witnesses.

ALBERT E. BEALS.

Witnesses:
T. A. M. DORR,
C. R. STICKNEY.